(12) United States Patent
McClatchie

(10) Patent No.: US 8,514,487 B2
(45) Date of Patent: Aug. 20, 2013

(54) REDUCING FLARE IN A LENS HAVING A DICHROIC FILTER

(75) Inventor: Iain Richard Tyrone McClatchie, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/367,959

(22) Filed: Feb. 9, 2009

(65) Prior Publication Data

US 2009/0201578 A1      Aug. 13, 2009

Related U.S. Application Data

(60) Provisional application No. 61/027,334, filed on Feb. 8, 2008.

(51) Int. Cl.
*G02B 5/20* (2006.01)

(52) U.S. Cl.
USPC .......................................... 359/361; 396/275

(58) Field of Classification Search
USPC ......................... 348/342; 396/275; 359/361
See application file for complete search history.

(56) References Cited

U.S. PATENT DOCUMENTS

| | | | |
|---|---|---|---|
| 3,278,752 A | | 10/1966 | Brixner |
| 4,686,986 A | * | 8/1987 | Fenyo et al. ............. 607/90 |
| 5,954,633 A | * | 9/1999 | Hirata ..................... 600/108 |
| 6,225,244 B1 | * | 5/2001 | Oguma ...................... 501/45 |
| 6,462,866 B1 | * | 10/2002 | Sugiyama et al. ........ 359/359 |
| 6,501,075 B1 | | 12/2002 | Trigiani |

(Continued)

FOREIGN PATENT DOCUMENTS

| CN | 101086546 A | 12/2007 |
|---|---|---|
| EP | 1701182 A1 | 9/2006 |

(Continued)

OTHER PUBLICATIONS

International Search Report and Written Opinion for PCT Application No. PCT/US2009/000806, mailed Jun. 4, 2009; 14 pages.

(Continued)

*Primary Examiner* — Arnel C Lavarias
(74) *Attorney, Agent, or Firm* — Sterne, Kessler, Goldstein & Fox P.L.L.C.

(57) ABSTRACT

In order to obtain an image with high color fidelity in an environment with a bright source in a field of view, flare must be minimized. An image device that reduces flare may include an absorptive UV cut filter positioned in an integrated optical system and a dichroic IR cut filter disposed on a lens in the optical system. The dichroic IR cut filter receives reflected light from one or more surfaces in the optical system at an angle of incidence larger than an angle of incidence of image light entering the dichroic IR cut filter, so that the reflected light is transmitted out of the system. The absorptive UV cut filter may be used to reduce UV-wavelength light reaching an image sensor of the image device. In this manner, the image device avoids processing undesirable wavelengths of light that is beyond the visible spectrum.

18 Claims, 10 Drawing Sheets

(56) References Cited

U.S. PATENT DOCUMENTS

| | | | |
|---|---|---|---|
| 7,684,113 B2 * | 3/2010 | Yamada et al. | 359/359 |
| 2002/0101546 A1 | 8/2002 | Sharp et al. | |
| 2003/0197947 A1 * | 10/2003 | Obama et al. | 359/676 |
| 2004/0165095 A1 | 8/2004 | Shimizu et al. | |
| 2005/0018302 A1 | 1/2005 | Yano et al. | |
| 2005/0179995 A1 | 8/2005 | Nikolov et al. | |
| 2005/0180014 A1 * | 8/2005 | Nikolov et al. | 359/580 |
| 2006/0050422 A1 * | 3/2006 | Ohshita et al. | 359/858 |
| 2006/0056070 A1 * | 3/2006 | Lee | 359/791 |
| 2006/0098300 A1 * | 5/2006 | Yamamoto et al. | 359/686 |
| 2006/0291061 A1 * | 12/2006 | Iyama et al. | 359/614 |
| 2007/0101398 A1 | 5/2007 | Islam | |
| 2007/0177280 A1 * | 8/2007 | Hirayama | 359/722 |
| 2007/0285555 A1 | 12/2007 | Chen | |
| 2007/0291365 A1 * | 12/2007 | Oshita et al. | 359/589 |
| 2009/0007177 A1 | 1/2009 | Islam | |
| 2009/0080090 A1 * | 3/2009 | Maruyama | 359/723 |
| 2009/0087087 A1 | 4/2009 | Palum et al. | |

FOREIGN PATENT DOCUMENTS

| | | | |
|---|---|---|---|
| JP | 06337350 A * | 12/1994 | |
| JP | 2002 202455 A | 7/2002 | |
| JP | 2007/094032 A | 4/2007 | |

OTHER PUBLICATIONS

Office Action and Search Report issued on Aug. 2, 2012 in Chinese Patent Application No. 200980110735.7, McClatchie, I. et al., filed Feb. 9, 2009.

English language translation of Office Action and Search Report issued on Aug. 2, 2012 in Chinese Application No. 200980110735.7, China Sinda Intellectual Property Ltd. (Beijing, China), mailed Sep. 4, 2012.

Office Action mailed Feb. 8, 2013 in Russian Patent Application No. 2010134760, Federal Service for Intellectual Property, Moscow, Russia, pp. 1-6 (an English language summary of the Office Action is appended, pp. 7-8).

Partial Search Report for European Patent Application No. 13153479.4, European Patent Office, Munich, Germany, issued on May 2, 2013.

English Language Abstract for Japanese Patent Application Publication No. JP 2007/094032 A, Espacenet Patent Search, http://worldwide.espacenet.com/.

Notification of the Second Office Action, dated May 23, 2013, Chinese Patent Application No. 200980110735.7, The State Intellectual Property Office of the People's Republic of China, 15 pages. (translation appended).

* cited by examiner

REDUCING FLARE IN A LENS HAVING A DICHROIC FILTER

CROSS REFERENCE TO RELATED APPLICATION

This application claims the benefit of U.S. Provisional Application No. 61/027,334, filed Feb. 8, 2008, titled "Reducing Flare in a Lens Having a Dichroic Filter," which is incorporated herein by reference in its entirety.

BACKGROUND

1. Field

Embodiments of the present invention generally relate to the field of imagery. More specifically, embodiments of the present invention refer to reducing flare in an optical system containing a dichroic cut filter.

2. Background

Digital camera sensors, such as CMOS and CCD sensors, are sensitive to wavelengths from approximately 380 nm to at least 1000 nm. The human eye, on the other hand, may only process colors residing in about the 400-700 nm range. As such, to process images only with colors visible to the human eye, short (e.g., <380 nm) and long (e.g., >700 nm) wavelengths of light must be filtered from the image. One technique to filter these undesirable wavelengths of light is to employ an ultra-violet (UV) cut filter to filter the shorter wavelengths of light and an infrared (IR) cut filter to filter the longer wavelengths of light. These cut filters attenuate the shorter and longer wavelengths of light, while transmitting wavelengths of light visible to the human eye.

There are two kinds of cut filters: absorptive cut filters and reflective cut filters. Absorptive cut filters are made with special dyes disposed on optical glass, whereas reflective cut filters are composed of several layers of sub-wavelength material disposed on an optical surface. A reflective cut filter may also be referred to as a dichroic cut filter. FIG. 1 illustrates a transmission curve for a UV/IR cut filter, where the filter transmits light within a passband 120 and attenuates light outside of cut bands 110 and 130. Absorptive and reflective cut filters transmit most light (e.g., >90% transmission of light) within passband 120 and block most wavelengths of light (e.g., <10% transmission of light) within cut bands 110 and 130, where cut bands 110 and 130 may span from, for example, 20-50 nm.

It is desirable to design the UV/IR cut filter with sharp cut bands such that the filter not only transmits wavelengths of light within passband 120 but also reduces the effect of "flare" on an image sensor. Flare will be discussed with respect to an image device 200 illustrated in FIG. 2. FIG. 2 illustrates an image device 200 with an optical system 202 incorporating a UV/IR cut filter 205. A digital single-lens reflex camera is an example of an image device with UV/IR cut filter 205 positioned between an image sensor 201 and optical system 202. Flare refers to light 207 that reaches image sensor 201 after reflecting off two or more surfaces in optical system 202. For example, as illustrated in FIG. 2, image light 203 may enter optical system 202 through aperture 206, pass through optical system 202, and reflect off a surface of UV/IR cut filter 205 as reflected light 207. Reflected light 207 is reflected back through UV/IR cut filter 205 by lens surface 204 prior to reaching image sensor 201. Reflected light 207 then causes a ghost image to appear on image sensor 201. Reflected light 207 may reflect off multiple surfaces in optical system 202. For example, reflected light 207 may reflect off walls in an assembly of optical system 202, dust particles in optical system 202, imperfections on optical surfaces in optical system 202, or an air/glass interface in optical system 202. Each ghost image caused by reflected light 207 may have a brightness orders of magnitude less than light from a primary image (e.g., a chief ray of light). However, in image applications with a bright source in a field of view (e.g., the sun in the background), the order of magnitude of brightness due to flare is much greater.

The effect of flare in image device 200 may be heightened by light outside of the UV/IR cut filter's passband entering optical system 202 and reaching image sensor 201. For instance, within cut bands 110 and 130, UV/IR cut filter 205 reflects approximately 50% of light and transmits 50% of light at the middle of cut bands 110 and 130. As such, a flare off UV/IR cut filter 205 may comprise one 0.5% reflection of light and one 50% reflection of light, along with a 50% transmission of light (note: most flares comprise two 0.5% reflections of light). UV/IR cut filter 205, as a result, passes more energy from flare in cut bands 110 and 130 as compared to energy from flare in passband 120. The energy from flare increases as cut bands 110 and 130 increase in width. For example, for a given passband, the energy from flare may increase approximately 50% as cut bands 110 and 130 increase from, for example, 20 to 40nm. The additional light received by image sensor 201 consequently reduces a signal/noise ratio of a processed image by image device 200 and also adds distracting artifacts to the resulting image.

As the brightness of non-image light increases, especially non-image light residing outside of the cut filter's passband, flare becomes a greater issue in the color fidelity of images.

SUMMARY

In order to obtain an image with high color fidelity, in an environment with a bright source in a field of view, flare must be minimized. In an embodiment of the present invention, an apparatus for reducing flare in an image device may include an absorptive UV cut filter positioned in an integrated optical system and a dichroic IR cut filter disposed on a lens in the optical system. The dichroic IR cut filter receives light reflected from one or more surfaces in the optical system at an angle of incidence larger than an angle of incidence of image light (e.g., a chief ray) entering the dichroic IR cut filter. The absorptive UV cut filter may be used to reduce a reflection of UV-wavelength light from reaching an image sensor of the image device. Further, the dichroic IR cut filter may be used to reduce a reflection of IR-wavelength light as an angle of incidence of the reflection of the IR-wavelength light striking the dichroic IR cut filter increases with respect to the angle of incidence of image light striking the dichroic cut filter.

In another embodiment, the image device may include a dichroic UV cut filter and an absorptive IR cut filter, such that the dichroic UV cut filter receives light reflected from one or more surfaces in the optical system at an angle of incidence smaller than an angle of incidence of image light entering the dichroic UV cut filter.

In another embodiment, a method for reducing flare in an image device may include the following steps: receiving reflected light and directing the reflected light away from an image sensor through an integrated optical system with an absorptive UV cut filter and a dichroic IR cut filter. The dichroic IR cut filter may be disposed on a lens in the optical system, where the dichroic IR cut filter may receive the reflected light at an angle of incidence larger than an angle of incidence of the image light entering the dichroic IR cut filter.

In another embodiment, a method for reducing flare in an image device may include the following steps: receiving reflected light and directing the reflected light away from an image sensor through an integrated optical system with an absorptive IR cut filter and a dichroic UV cut filter. The dichroic UV cut filter may be disposed on a lens in the optical system, where the dichroic UV cut filter may receive the reflected light at an angle of incidence smaller than an angle of incidence of the image light entering the dichroic IR cut filter.

Further embodiments, features, and advantages of the present invention, as well as the structure and operation of the various embodiments are described in detail below with reference to accompanying drawings.

BRIEF DESCRIPTION OF THE DRAWINGS

The present invention is illustrated by way of example, and not by way of limitation, in the figures of the accompanying drawings in which.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

In one embodiment, the apparatus and methods described herein may be used with various image devices such as digital single-lens reflex cameras. Alternatively, the apparatus and methods herein may be used with other types of image devices.

Figure 1:
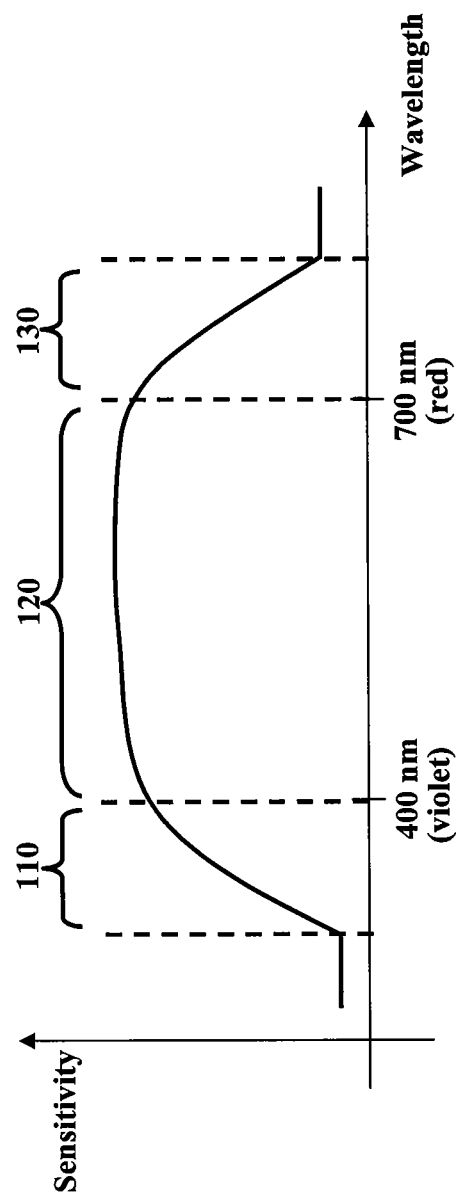
FIG. 1 illustrates passband and cut band regions of a transmission curve for a UV/IR cut filter.
Figure 2:
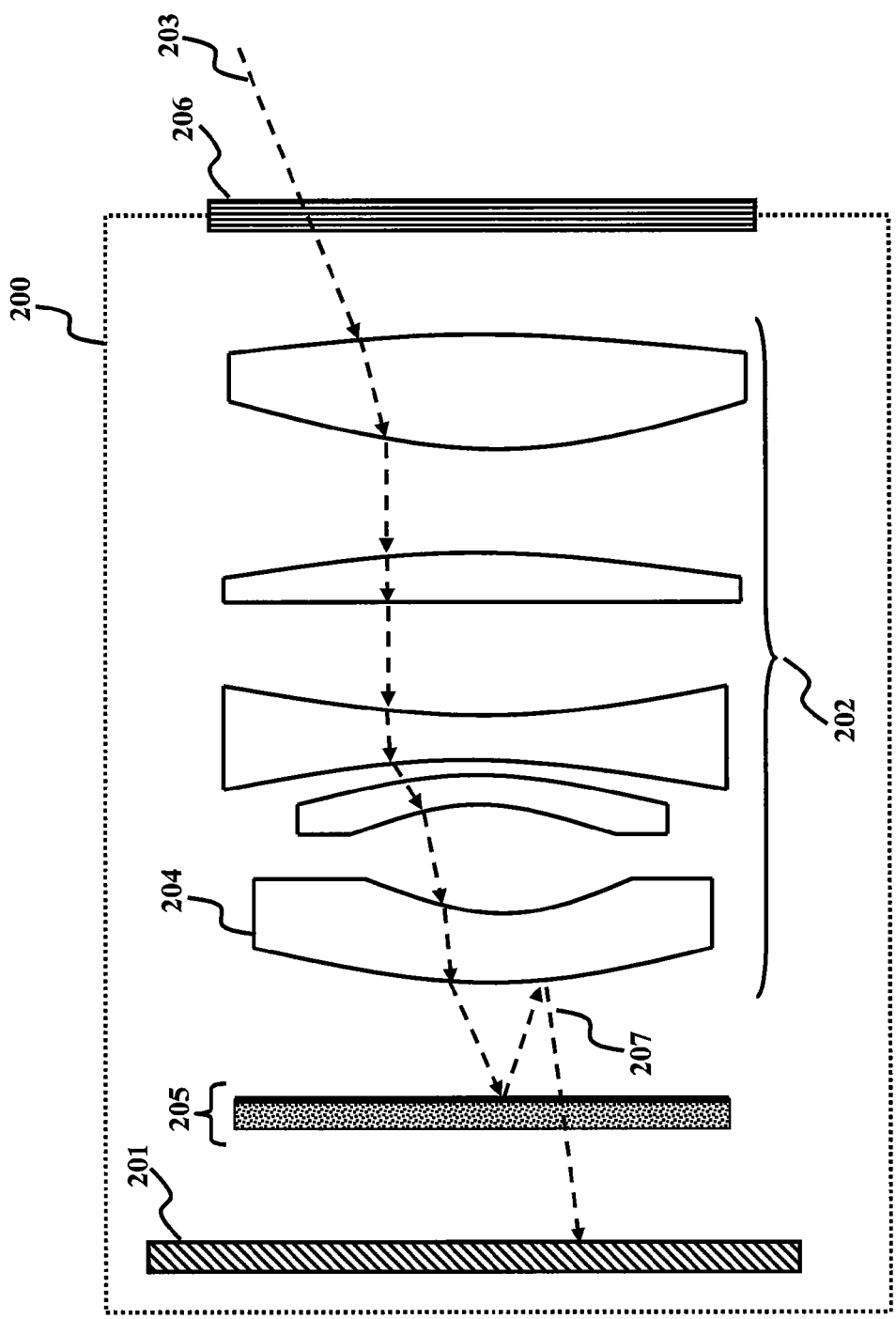
FIG. 2 illustrates flare from reflected light in an optical system of an image device.
Figure 3:
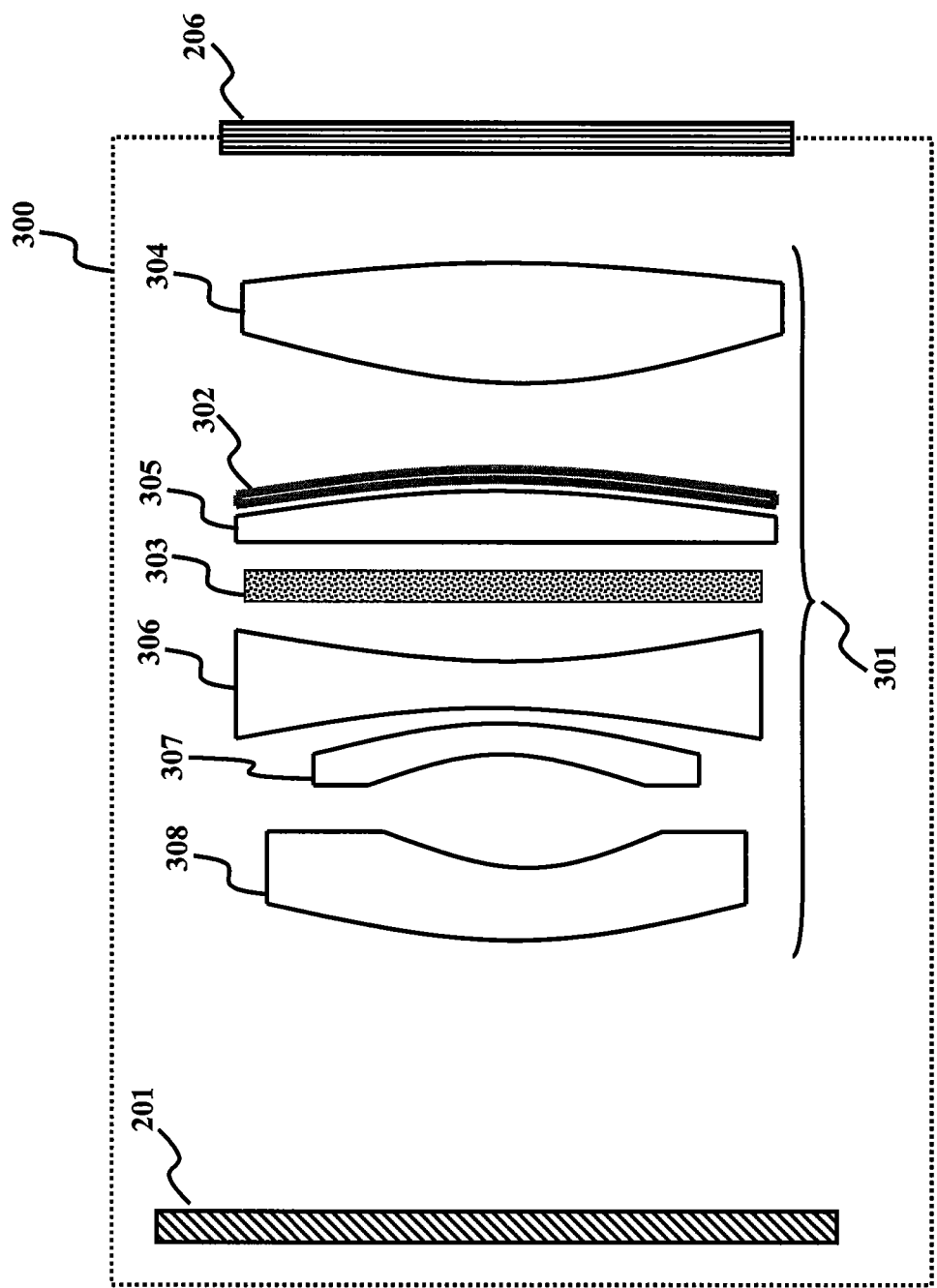
FIG. 3 illustrates one embodiment of an integrated optical system, with an absorptive UV cut filter and a dichroic IR cut filter, for reducing flare in an image device.

FIG. 3 illustrates one embodiment of an image device 300 with an optical system 301 configured to minimize flare. Optical system 301 is integrated into image device 300, where optical system 301 transmits light received by aperture 206 to image sensor 201. Optical system 301 may include one or more lenses 304-308 to receive light and to project the light onto a detector plane of image sensor 201. In addition to lenses 304-308, optical system 301 includes a dichroic infrared (IR) cut filter 302 and an absorptive ultraviolet (UV) cut filter 303.

Dichroic IR cut filter 302 and absorptive UV cut filter 303 may be used to selectively pass a specified range of wavelengths while reflecting other wavelengths. For example, dichroic IR cut filter 302 may block IR wavelengths of light, while transmitting shorter wavelengths of light. Absorptive UV cut filter 303, conversely, may block UV wavelengths of light, while transmitting longer wavelengths of light. Together, dichroic IR cut filter 302 and absorptive UV cut filter 303 block light in the IR and UV spectrums, respectively, while transmitting visible light. The specific wavelengths of light mentioned in the description of image device 300 and optical system 301, and throughout this application, are given for example purposes only and are not meant to be limiting. Those skilled in the relevant art will recognize that other wavelength applications for image device 300 and optical system 301 may be used based on the discussion herein. These other wavelength applications are within the scope and spirit of the present invention.

Absorptive UV cut filter 303 absorbs a significant portion of UV-wavelength light in optical system 301, while transmitting light residing in the visible and IR spectrum. A dichroic cut filter, such as dichroic IR cut filter 302, however, does not have as sharp of a cut band as an absorptive cut filter. Therefore, some IR light may still be transmitted through dichroic IR cut filter 302. Such transmission depends on an angle of incidence at which light strikes dichroic IR cut filter 302. This characteristic of dichroic IR cut filter 302 may be used to reduce flare from non-image light in an IR cut band region of the cut filter's transmission curve.

Figure 4:
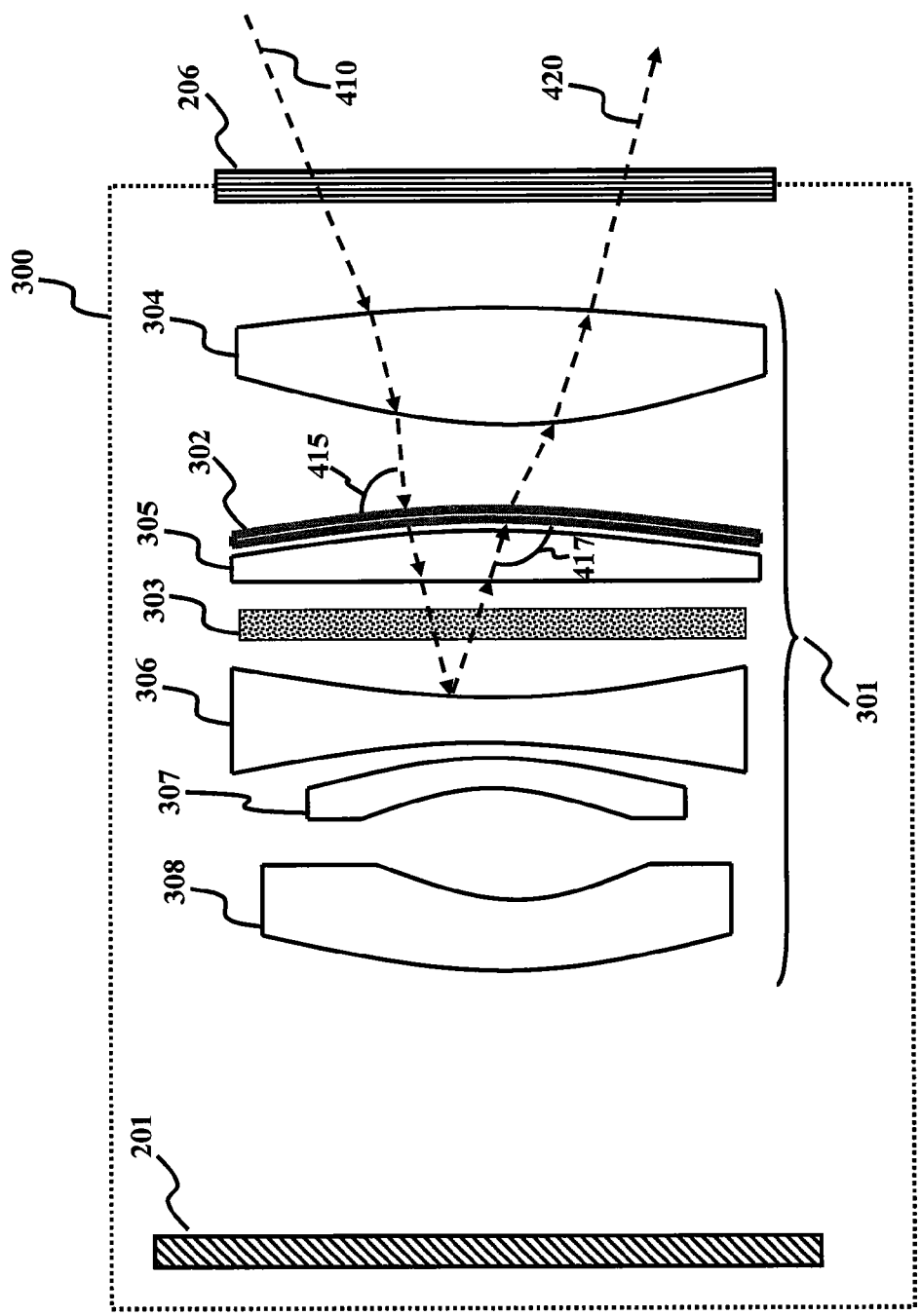
FIG. 4 illustrates a reduction of flare in one embodiment of an integrated optical system, with an absorptive UV cut filter and a dichroic IR cut filter, for reducing flare in an image device.

In image device 300, flare may be reduced by disposing dichroic IR cut filter 302 along a surface of a lens 305 in optical system 301, where dichroic IR cut filter 302 receives light reflected from other surfaces in optical system 301 at an angle of incidence larger than an angle of incidence of image light (e.g., angle of incidence of the chief image ray) entering dichroic IR cut filter 302. FIG. 4 illustrates image light 410 entering aperture 206, traveling through lens 304, striking dichroic IR cut filter 302 at a first angle of incidence 415, and reflecting off a surface of lens 306 as reflected light 420. Reflected light 420 strikes dichroic IR cut filter 302 at a second angle of incidence 417 that is larger than first angle of incidence 415. The transmission curve of dichroic IR cut filter 302 shifts towards longer wavelengths as the angle of incidence of reflected light 420 increases.

Figure 5:
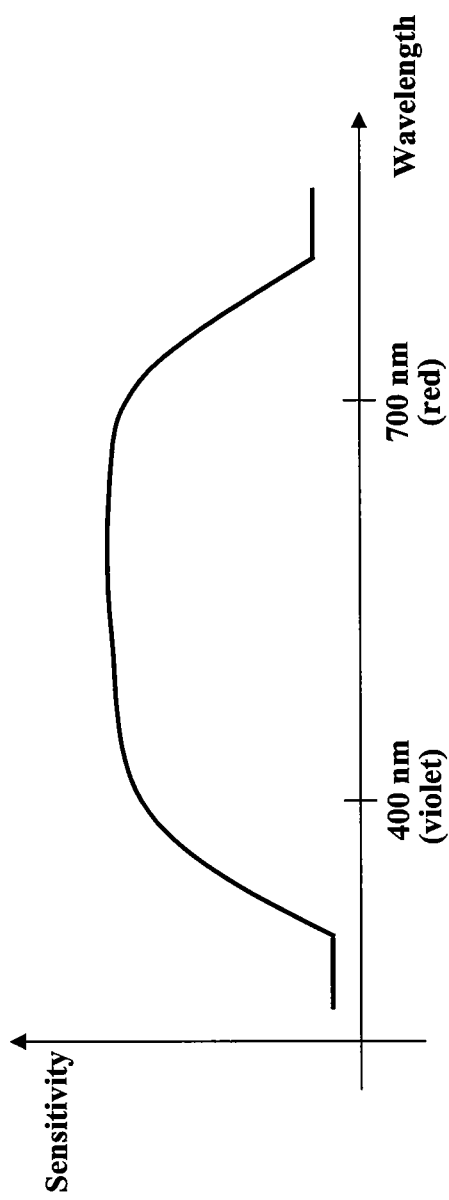
FIG. 5 illustrates a transmission curve of a dichroic UV/IR cut filter.
Figure 6:
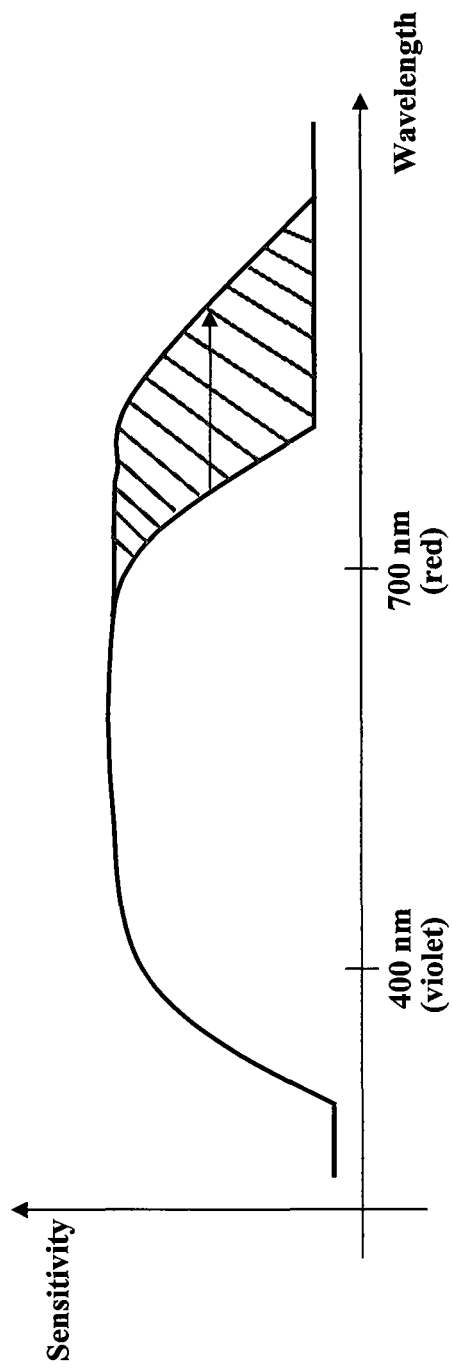
FIG. 6 illustrates a widening of an IR cut band in a transmission curve of a dichroic UV/IR cut filter.

For instance, in reference to FIG. 5, dichroic IR cut filter 302 may have a specific transmission curve, where an IR cut band begins to roll off at 700nm for a specific angle of incidence of light striking the filter. As illustrated in FIG. 6, if the angle of incidence of light striking the cut filter increases, then the roll off of the IR cut band may shift to longer wavelengths. In FIG. 6, dichroic IR cut filter 302 may transmit light at wavelengths longer than the visible spectrum (e.g., >700 nm). As a result, dichroic IR cut filter 302 reduces the effect of flare by transmitting reflected light 420, since the passband of the filter's transmission curve is widened and thus able to transmit reflected light 420, including components of reflected light 420 residing in the IR spectrum.

Figure 7:
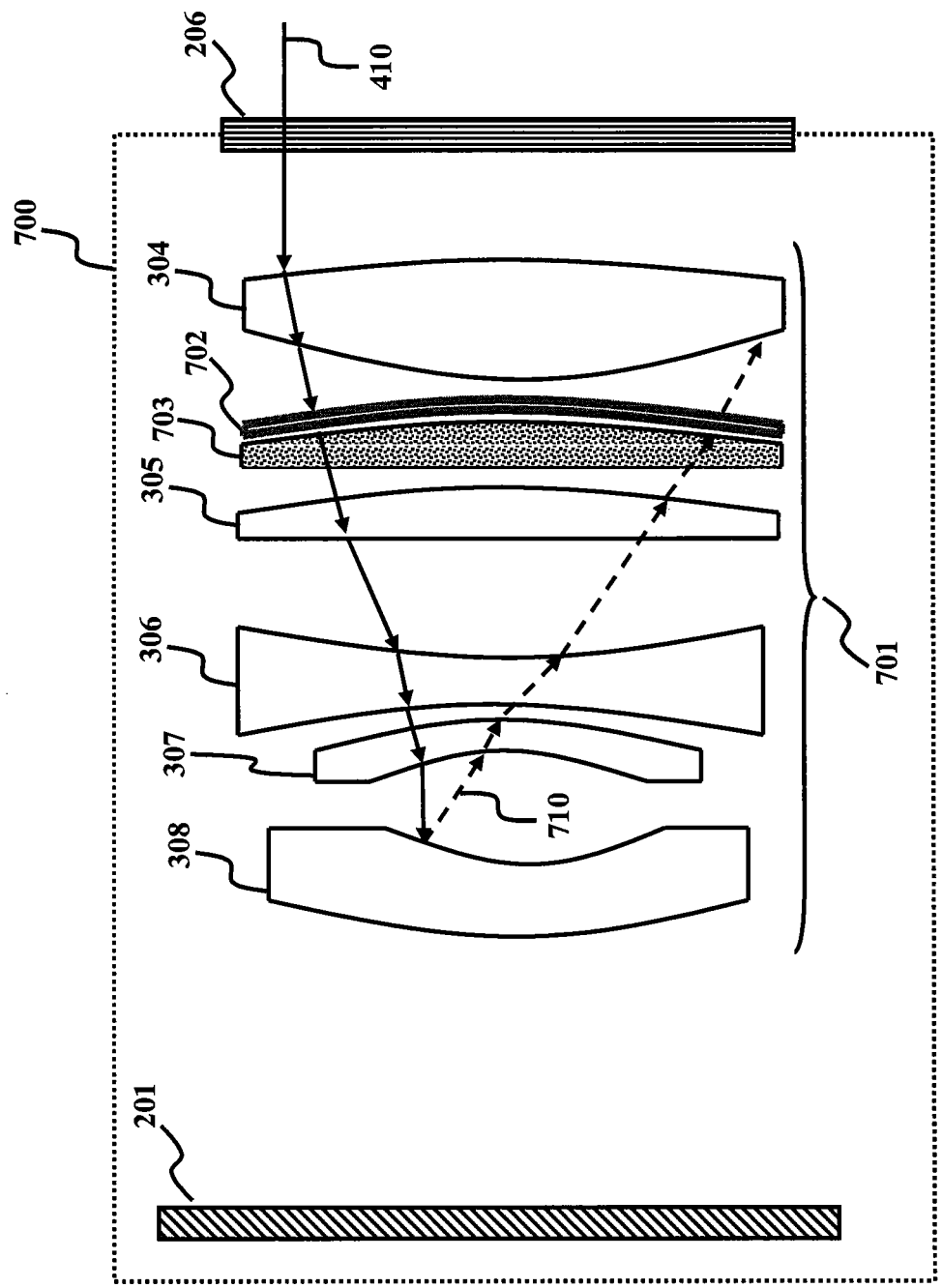
FIG. 7 illustrates a reduction of flare in another embodiment of an integrated optical system, with an absorptive UV cut filter and a dichroic IR cut filter, for reducing flare in an image device.

A person skilled in the relevant art will appreciate that dichroic IR cut filter 302 may be disposed along one of many optical surfaces in optical system 301 as long as the optical surface receives reflected light 420 at an angle of incidence larger than an angle incidence of image light 410 striking dichroic IR cut filter 302. For example, as illustrated in FIG. 7, a dichroic IR cut filter 702 may be disposed along a surface of an absorptive UV cut filter 703. In this configuration, reflected light 710 (residing in the IR spectrum) may transmit through dichroic IR cut filter 702 since the angle of incidence of reflected light 710 striking dichroic IR cut filter 702 is larger than the angle of incidence of image light 410 entering dichroic IR cut filter 702.

Figure 8:
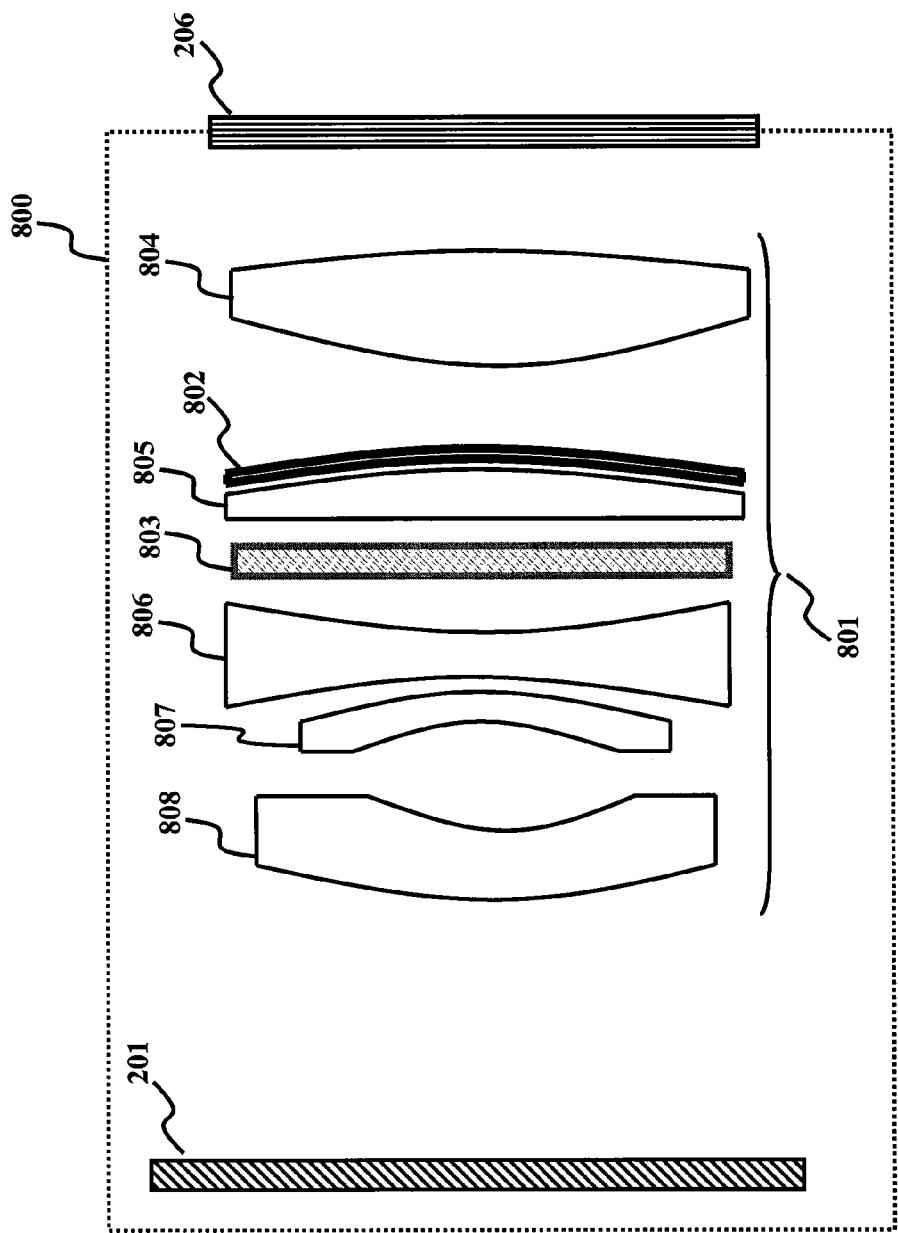
FIG. 8 illustrates one embodiment of an integrated optical system, with an absorptive IR cut filter and a dichroic UV cut filter, for reducing flare in an image device.

FIG. 8 illustrates another embodiment of an image device 800 with an optical system 801 configured to minimize flare. Similarly to optical system 301 in FIG. 3, optical system 801 is integrated into image device 800, in which optical system 801 transmits light received by aperture 206 to image sensor 201. Additionally, optical system 801 may include one or more lenses 804-808 to receive light and to project the light onto a detector plane of image sensor 201. Among lenses 804-808, optical system 801 includes a dichroic UV cut filter 802 and an absorptive IR cut filter 803. Together, dichroic UV cut filter 802 and absorptive IR cut filter 803 block light in the UV and IR spectrums, respectively, while transmitting visible light.

Absorptive IR cut filter 803 effectively absorbs IR-wavelength light in optical system 801, while transmitting light residing in the visible and UV spectrum. Because dichroic filters do not have as sharp of a cut band as absorptive filters, dichroic UV cut filter 802 may either reflect or transmit the light depending on an angle of incidence at which light strikes dichroic UV cut filter 802. This characteristic of dichroic UV cut filter 802 may be used to reduce flare from light in the UV cut band region of the cut filter's transmission curve.

Figure 9:
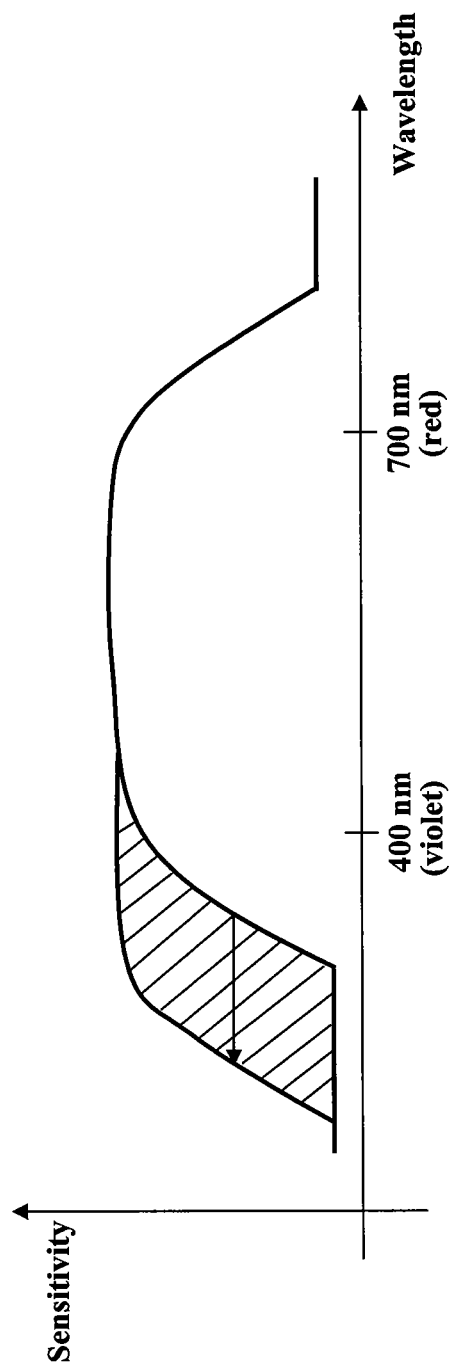
FIG. 9 illustrates a widening of a UV cut band in a transmission curve of a dichroic UV/IR cut filter.

Similar to the transmission curve of dichroic IR cut filter 302 in FIG. 3, the transmission curve of dichroic UV filter 802 shifts according to an angle of incidence of light striking the cut filter. For instance, referring to FIG. 5, dichroic UV cut filter 802 may have a specific transmission curve, where a UV cut band region begins to roll off at 400 nm for a specific angle of light striking the filter. As illustrated in FIG. 9, if the angle of incidence of light striking the cut filter decreases, then the roll off of the UV cut band may shift to shorter wavelengths. In FIG. 9, dichroic UV cut filter 802 transmits light at wavelengths shorter than the visible spectrum (e.g., <400 nm). As a result, dichroic UV cut filter 802 can reduce the effect of flare caused by reflected light by transmitting the reflected UV-wavelength light back through dichroic UV cut filter, since the passband of the filter's transmission curve is widened and thus able to transmit the reflected light, including components of the reflected light residing in the UV spectrum.

Similar to dichroic IR cut filter 702 in FIG. 7, a person skilled in the relevant art will appreciate that dichroic UV cut filter 802 may be disposed along one of many optical surfaces in optical system 801 as long as the optical surface receives reflected light at an angle of incidence smaller than an angle of incidence of image light striking dichroic UV cut filter 802.

Figure 10:
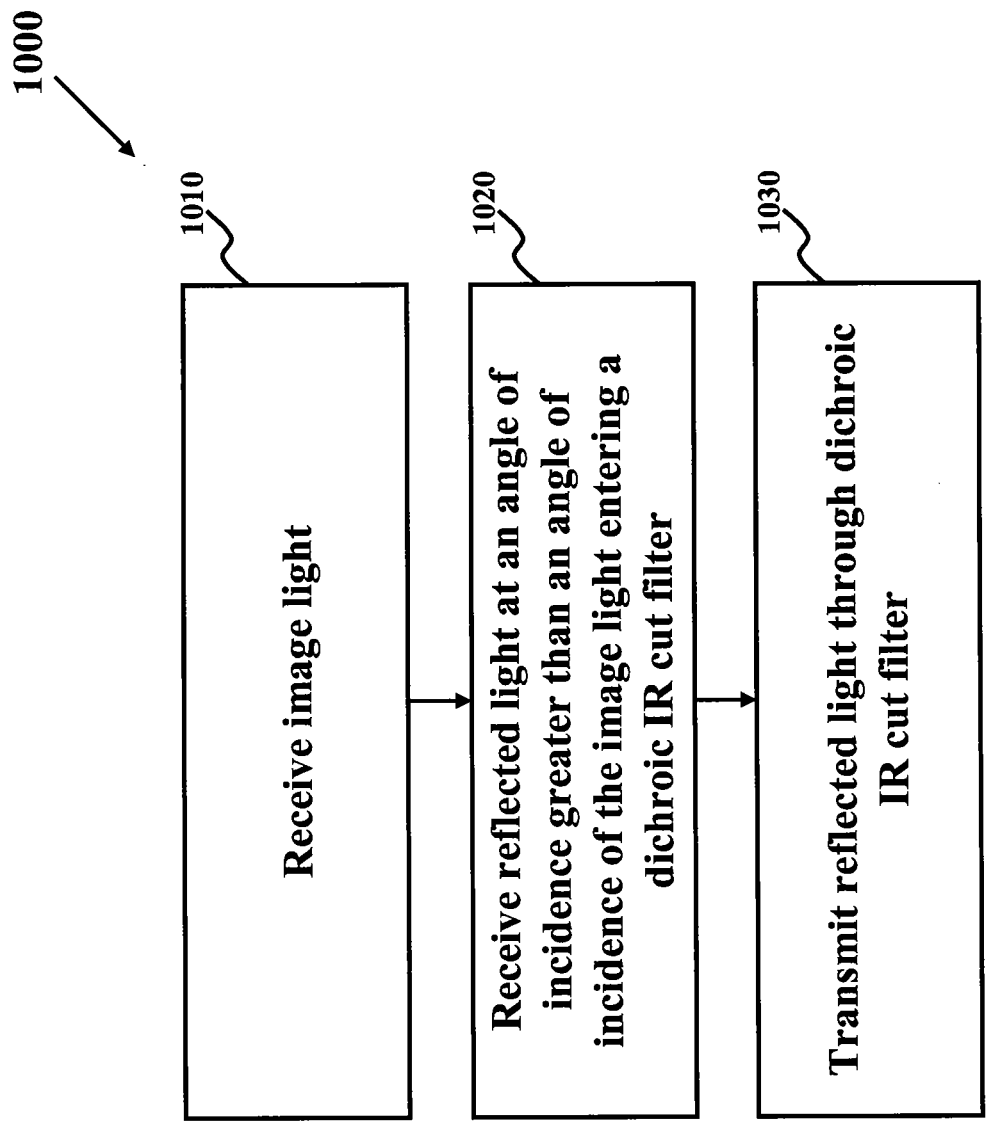
FIG. 10 illustrates one embodiment of a method for reducing flare in an image device.

FIG. 10 illustrates one embodiment of a method 1000 for reducing flare in an image device. Method 1000 may occur using, for example, image device 300. In step 1010, image light is received by the image device. Image light refers to light that is associated with an imaged object (e.g., chief rays of light). The image light may be received by an aperture of the image device.

In step 1020, light reflected off one or more surfaces in the image device (e.g., non-image light) is received by a dichroic IR cut filter at an angle of incidence greater than an angle of incidence of image light entering the dichroic IR cut filter, such that the reflected light is transmitted back through the dichroic IR cut filter in step 1030. In this way, the reflected light is directed away from an image sensor of the image device and ghost images on the image sensor are reduced. The reflected light may reflect off one or more surfaces in an integrated optical system of the image device.

In another embodiment, light reflected off one or more surfaces in the image device (e.g., non-image light) is received by a dichroic UV cut filter at an angle of incidence greater than an angle of incidence of image light entering the dichroic UV cut filter, such that the reflected light is transmitted back through the dichroic UV cut filter in step 1030.

While various embodiments of the present invention have been described above, it should be understood that they have been presented by way of example, and not limitation. It will be apparent to persons skilled in the relevant art(s) that various changes can be made therein without departing from the scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. An apparatus for reducing flare in an image device, comprising:
    first, second, and third lens groups located along an optical path at first, second, and third distances from an aperture, wherein each lens group comprises at least one lens;
    an absorptive ultraviolet (UV) cut filter having a flat surface positioned within the second lens group; and
    a dichroic infrared (IR) cut filter having a curved surface positioned within the second lens group disposed on a lens adjacent to the UV cut filter,
    wherein the second distance is greater than the first, the third distance is greater than the second, and the curved surface of the dichroic IR cut filter is positioned to receive reflected light from one or more optical surfaces in the optical system at an angle of incidence larger than an angle of incidence of image light entering the dichroic IR cut filter.

2. The apparatus of claim 1, wherein the optical system is configured to receive chief rays of light from an imaged object and to project the chief rays of light onto a detector plane of an image sensor.

3. The apparatus of claim 2, wherein the dichroic IR cut filter is configured to reduce a reflection of IR-wavelength light as an angle of incidence of reflected light striking the dichroic IR cut filter increases.

4. The apparatus of claim 3, wherein the dichroic IR cut filter and the absorptive UV cut filter are disposed on the same lens.

5. The apparatus of claim 1, wherein the one or more optical surfaces from which reflected light is received comprises at least one of: walls in an assembly of the optical system, dust particles in the optical system, imperfections on optical surfaces in the optical system, or an air/glass surface interface in the optical system.

6. An apparatus for reducing flare in an image device, comprising:
   first, second, and third lens groups located along an optical path at first, second, and third distances from an aperture, wherein each lens group comprises at least one lens;
   an absorptive infrared (IR) cut filter having a flat surface positioned within the second lens group; and
   a dichroic ultraviolet (UV) cut filter having a curved surface positioned within the second lens group disposed on a lens adjacent to the IR cut filter,
   Wherein the second distance is greater than the first, the third distance is greater than the second, and the curved surface of the dichroic UV cut filter is positioned to receive reflected light from one or more optical surfaces in the optical system at an angle of incidence smaller than an angle of incidence of image light entering the dichroic UV cut filter.

7. The apparatus of claim 6, wherein the optical system is configured to receive chief rays of light from an imaged object and to project the chief rays of light onto a detector plane of an image sensor.

8. The apparatus of claim 7, wherein the dichroic UV cut filter is configured to reduce a reflection of UV-wavelength light as an angle of incidence of reflected light striking the dichroic UV cut filter decreases.

9. The apparatus of claim 8, wherein the dichroic UV cut filter and the absorptive IR cut filter are disposed on the same lens.

10. The apparatus of claim 6, wherein the one or more optical surfaces from which reflected light is received comprises at least one of: walls in an assembly of the optical system, dust particles in the optical system, imperfections on optical surfaces in the optical system, or an air/glass surface interface in the optical system.

11. The apparatus of claim 1, wherein the dichroic IR cut filter is disposed on a surface of the absorptive UV cut filter.

12. The apparatus of claim 1, wherein the optical system comprises a first lens proximate to an image sensor of the image device and a second lens proximate to an aperture of the image device.

13. The apparatus of claim 12, wherein the dichroic IR cut filter is disposed on a third lens in the optical system, the third lens positioned between the first and second lenses.

14. The apparatus of claim 6, wherein the dichroic UV cut filter is disposed on a surface of the absorptive IR cut filter.

15. The apparatus of claim 6, wherein the optical system comprises a first lens proximate to an image sensor of the image device and a second lens proximate to an aperture of the image device.

16. The apparatus of claim 15, wherein the dichroic UV cut filter is disposed on a third lens in the optical system, the third lens positioned between the first and second lenses.

17. An apparatus for reducing flare in an image device, comprising:
   first, second, and third lens groups located along an optical path at first, second, and third distances from an aperture, wherein each lens group comprises at least one lens;
   an absorptive ultraviolet (UV) cut filter having a flat surface positioned within the second lens group; and
   a dichroic infrared (IR) cut filter having a curved surface positioned within the second lens group adjacent to the UV cut filter,
   wherein the second distance is greater than the first, the third distance is greater than the second, and the curved surface of the dichroic IR cut filter is positioned to receive reflected light from one or more optical surfaces in the optical system at an angle of incidence larger than an angle of incidence of image light entering the dichroic IR cut filter.

18. An apparatus for reducing flare in an image device, comprising:
   first, second, and third lens groups located along an optical path at first, second, and third distances from an aperture, wherein each lens group comprises at least one lens;
   an absorptive infrared (IR) cut filter having a flat surface positioned within the second lens group; and
   a dichroic ultraviolet (UV) cut filter having a curved surface positioned within the second lens group adjacent to the IR cut filter,
   wherein the second distance is greater than the first, the third distance is greater than the second, and the curved surface of the dichroic UV cut filter is positioned to receive reflected light from one or more optical surfaces in the optical system at an angle of incidence smaller than an angle of incidence of image light entering the dichroic UV cut filter.

* * * * *

UNITED STATES PATENT AND TRADEMARK OFFICE
CERTIFICATE OF CORRECTION

| | | |
|---|---|---|
| PATENT NO. | : 8,514,487 B2 | Page 1 of 1 |
| APPLICATION NO. | : 12/367959 | |
| DATED | : August 20, 2013 | |
| INVENTOR(S) | : Iain Richard Tyrone McClatchie | |

It is certified that error appears in the above-identified patent and that said Letters Patent is hereby corrected as shown below:

In the Claims

<u>Column 7</u>

Line 29, please replace "Wherein" with --wherein--.

Signed and Sealed this
Eighth Day of April, 2014

Michelle K. Lee
*Deputy Director of the United States Patent and Trademark Office*